Jan. 19, 1937.  J. H. ALESSI  2,067,882
TIRE INFLATER
Filed Aug. 20, 1934
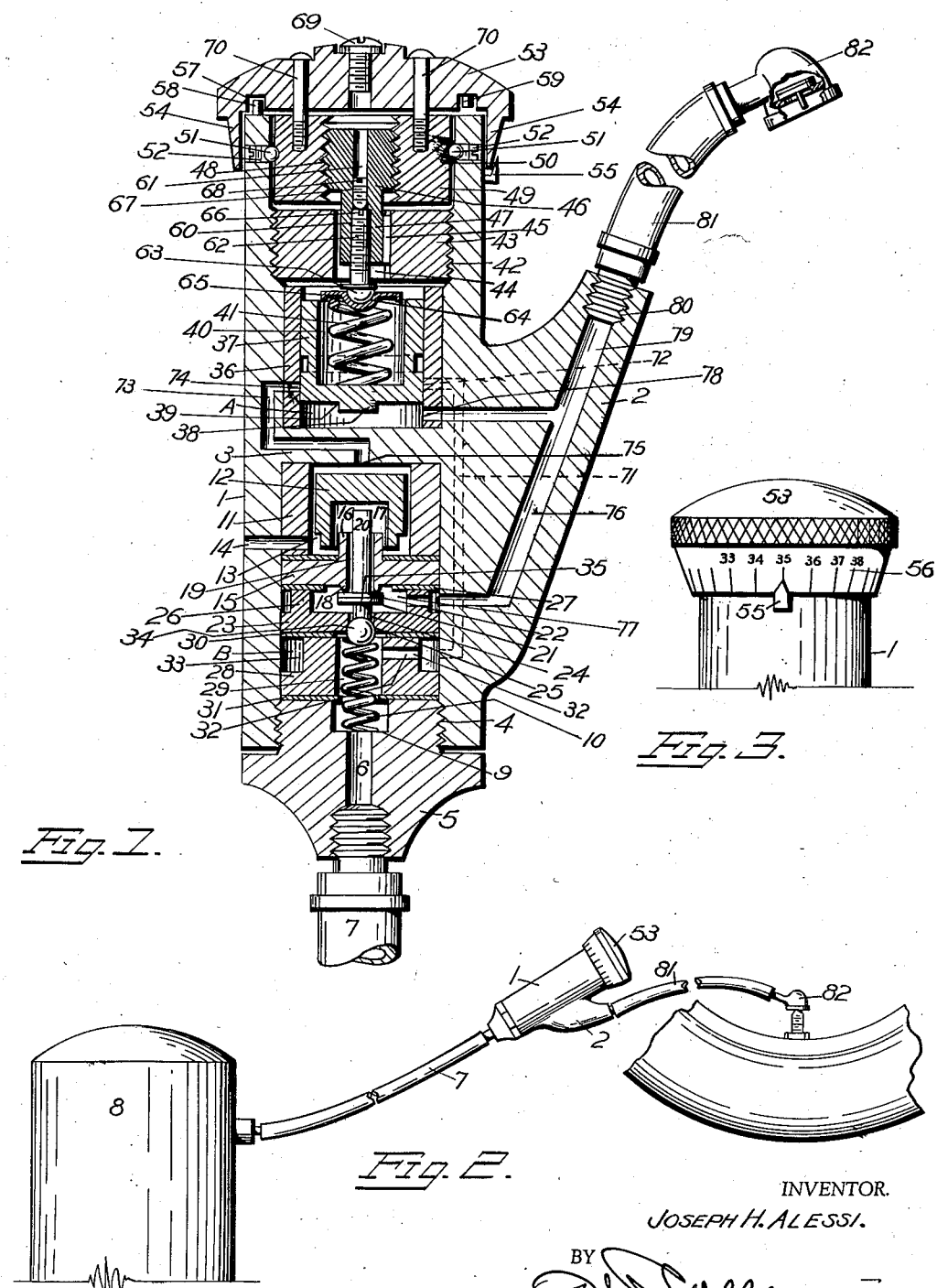
INVENTOR.
JOSEPH H. ALESSI.
BY
ATTORNEY.

Patented Jan. 19, 1937

2,067,882

UNITED STATES PATENT OFFICE 2,067,882

TIRE INFLATER

Joseph H. Alessi, Denver, Colo., assignor, by direct and mesne assignments, to George S. Postma, Denver, Colo.

Application August 20, 1934, Serial No. 740,716

4 Claims. (Cl. 50—11)

This invention relates to improvements in devices of the type employed for the purpose of inflating a container to a given pressure from a reservoir containing air under higher pressure, and in the specific embodiment illustrated relates to a device for use in inflating automobile tires.

It is an object of this invention to produce an automatic tire inflating device of the pulsating type which shall be of such small size that it is readily portable and which can be held in the hand of the operator while in use.

Another object of this invention is to produce a device of the type specified which can be readily adjusted to any desired pressure and which will function automatically to limit the pressure in the tire inflated to the predetermined value.

A still further object of this invention is to produce a device of such construction that it will operate in any position with equal accuracy and which shall be so designed that it will withstand any reasonable amount of rough usage.

The above and other objects that will become apparent as this description proceeds are attained by means of a construction and an arrangement of parts that will now be described in detail and for this purpose, reference will now be had to the accompanying drawing in which one specific embodiment thereof has been shown, and in which Figure 1 is a longitudinal diametrical section through the device, Figure 2 is a view showing the device in use for inflating an automobile tire, and Figure 3 is a side elevation of the upper end of the device showing the dial and the scale with which it is provided.

In the drawing, reference numeral 1 designates the body member which is preferably of cylindrical cross section, and is provided on one side with a projection 2. Member 1 has a central cylindrical opening that is separated by a transverse partition 3 into two compartments A and B. For convenience in referring to and identifying these compartments throughout the specification and claims, they will be referred to respectively as the upper and the lower compartment.

The open end of the lower compartment has a portion of its inner surface threaded as indicated by reference numeral 4, and is closed by a plug 5, having a central opening 6 that will be referred to as the inlet. A hose 7 (Figure 2) extends from the inlet to the reservoir 8.

The upper end of opening 6 is enlarged in diameter so as to provide a shoulder 9 on which the lower end of the spring 10 rests. Positioned in the lower compartment with its upper end in contact with the lower surface of partition 3 is a bushing 11 whose inner surface is carefully machined and polished and within which is located a piston 12, which has an easy sliding fit with the opening in bushing 11, and which permits some air to pass. The lower end of the outer surface of the piston 12 has a groove 13 that communicates at all times with the opening 14 through which the leakage between the piston and the cylinder can escape to the outside. The purpose of this will appear hereinafter.

Located below the bushing 11 is a partition 15 whose upper surface has a central hub 16 that extends into the cylindrical recess 17 in the piston. A valve seat 18 surrounds the lower end of the opening 19. A pin 20 extends through the opening 19 and terminates adjacent the bottom of the recess 17. Pin 20 has an annular flange 21 that projects beyond the seat 18 and which carries a leather or rubber washer 22. A washer is preferably provided between the bottom of the bushing 11 and the top of the partition 15. The length of the pin 20 is such that when the piston 12 is in its lowermost position, the washer 22 will be spaced a short distance from the valve seat 18 so as to open the valve. Located below the partition 15 is another partition, which has been designated by reference numeral 23; this partition has a central opening 24 whose lower edge is chamfered so as to provide a valve seat 25. Partition 23 has an annular upwardly extending flange 26 that is separated from the underside of partition 15 by a washer 27.

Located between the upper end of the plug 5 and the lower surface of partition 23 is an annular spacer which has an axial opening 29 that registers with the upper enlarged section of opening 6 and in which the spring 29 is located. Washers 30 and 31 may be positioned between members 23 and 28 and 28 and 5 respectively if desired. The upper portion of member 28 may be reduced in outside diameter and may be provided with an opening 32 through which the air may pass from opening 29 into the annular chamber 33. The plug 5 serves to clamp the several parts located in the lower compartment and to hold them in assembled position. A ball 34 is supported on the spring 10 which is under compression and normally holds the ball against the seat 25. The pin 20 has a portion 35 which extends into the opening 24 and terminates adjacent the top of the ball. The total length of parts 20 and 35 is such that when the piston 12 is in its lowermost position the ball will be removed from its seat as well as the member 22.

In the upper compartment a bushing 36 is so positioned that its lower end rests on the upper surface of partition 3. A piston 37 is slidably mounted in the bushing and has as air-tight a fit as possible without interfering with its free movement. The lower end of the piston has a central circular projection 38 which serves as a stop when it engages the partition 3. A sealing washer 39 surrounds the projection 38. Piston 9 has a central cylindrical recess 40 in which is located a spring 41.

The wall of the upper compartment has a threaded section 42 with which is connected a plug 43, having a central opening 44, whose wall has a groove for the reception of the spline 45. A pin 46 has a portion 47 of the proper size to fit the opening 44 and has a groove for the reception of the spline 45 so that it can slide but not rotate with respect to 43. The outside of the upper portion of pin 46 is threaded as indicated by reference character 48 and is threadedly connected with an annular nut; this nut has a semicircular groove 50 in its outer surface with which the balls 51 cooperate, and which are held in place by screws 52. A cap 53 is located at the top of the body member and has a cylindrical skirt 54 that projects downwardly over member 1, and which is tapered toward the bottom as shown in Figure 1. A pointer 55 is fastened to the member 1 and projects over the outside of the skirt 54. The outer surface of the skirt 54 is graduated so as to form a scale 56 with which the pointer 55 cooperates.

The under surface of the dial member 53 has a groove 57 into which the pin 58 projects, and this pin cooperates with pin 59 carried by the dial. The function of pins 58 and 59 is to limit the rotation of the dial to substantially 360 degrees. Pin 46 has an axial opening consisting of two sections 60 and 61 of different diameters. Positioned in section 60 is an abutment pin 62 having a semispherical head 63 that rests in a correspondingly shaped depression 64 of the washer 65 that is supported on the top of spring 41.

The upper end of pin 62 has a transverse slot 66 by means of which it can be turned by a screw driver. A lock plug 67 is located in opening 61 and has a slot 68 for a screw driver. A screw 69 closes the top of the opening 61. The dial member 53 is attached to the nut 49 by two screws 70. When the dial 53 is rotated the nut 49 turns, and this, in turn, moves the pin 46 up or down, and thereby varies the compression of spring 41.

The body 1 is provided with three separate passages, one of which has been designated by numeral 71. The lower end of passage 71 communicates with the annular chamber 33 in the lower compartment and with the upper compartment at point 72. A complementary passage 73 communicates at its upper end with the upper compartment at point 74 and with the lower compartment at 75. A third passage, which has been designated by numeral 76, communicates at its lower end with the space 77 between the diaphragms 15 and 23, and with the upper compartment near its bottom at point 78. The passage 76 has a branch 79 that terminates in the threaded section 80 to which the hose 81 is connected. The end of hose 81 has the usual chuck 82 (Figure 2) which is provided with the usual chuck valve. The piston 37 has a groove 83 in its outer surface and this is so positioned that it will interconnect the passages 71 and 73 when the piston is in its lowermost position, but which will prevent air from flowing from 71 to 73 when the piston is located as shown in Figure 1.

With the parts assembled as shown and described, let us consider a case in which hose 7 is connected to a reservoir 8 containing air at, let us say, 100 pounds per square inch, and that the device has already been properly calibrated. Let us assume that the tire 83 is to be inflated to 35 pounds. The dial is turned until the division marked 35 is directly under the pointer 55. The valve in chuck 82 is, of course, closed.

The pressure from reservoir 8 is communicated through hose 7 and passage 71 against the wall of piston 37. Before the pressure was turned into hose 7, the piston 37 was in its lowest position, and passages 71 and 73 were interconnected by groove 83 in the piston 37. When the pressure is turned on, the air will flow through passage 71, groove 83 into passage 73, and into the space above piston 12 in the lower compartment. Piston 12 will move downwardly and open valve 34, whereupon air will flow through opening 24 and into the passage 76. Since the chuck at the end of hose 81 is closed, the pressure soon increases to that of reservoir 8, and piston 37 is moved up into the position shown in Figure 1, thereby cutting off the pressure on the top of piston 12.

Since air can leak by piston 12 and out through hole 14, the pressure on the top of this piston will soon fall, and since the piston is acted on by spring 10, and also by air pressure that flows through the open valve 18, 22, this piston will move upwardly and permit valves 34, 25 and 18, 22 to close, and since passage 76 contains air at high pressure, the parts will remain in this position until a change of pressure occurs in passage 76.

Let us now assume that the chuck 82 is applied to a valve stem whereby the chuck valve in the chuck is opened. If the tire contains air under the same pressure as that in hose 81 or higher, no change will occur, but if the pressure in the tire is lower, air will immediately begin to flow, thereby reducing the pressure in passages 76 and 79 to that of the tire, and piston 37 will move downwardly until groove 83 connects passages 71 and 73, whereupon piston 12 will move downwardly and open valve 34, whereupon air will flow from the reservoir 8 into passage 76 and hose 81, and this pressure will move piston 37 upwardly. Piston 12 will now begin to move upwardly, at a speed depending on the amount of the leakage, and valve 34 will soon close, whereupon the pressure applied to the piston 37 is reduced to that in the tire, and this will be repeated until tire pressure gets high enough to hold the piston 37 against the action of the spring 41 when further operation ceases.

It will be apparent from the above that this device "pulsates" and applies to the tire a rapid succession of air impulses at substantially the pressure in reservoir 8.

Having described the invention, what is claimed as new is:

1. A device for use in charging a container with a given pressure from a reservoir containing air at a higher pressure comprising in combination, a body member having a cylindrical opening extending therethrough, and divided into an upper and a lower compartment by an imperforate transverse partition, an adjustable pressure control device comprising a grooved piston located in the upper compartment, a valve mechanism in the lower compartment, the body member having three passages for interconnecting the two compartments, one of the passages extending from a point near the lower end of the lower compartment to a point some distance above the bottom of the upper compartment, a complementary passage extending from a point similarly located in the upper compartment as that of the first passage, to a point near the top of the lower compartment, a branched discharge passage having one end in communication with the lower compartment at a point above the corresponding opening from the first passage and the other end in communication with the upper compartment near its bottom, the lower end of the lower compartment being provided with an inlet opening for establishing connection with a pressure fluid reservoir, said opening being in constant communication with the lower end of the first mentioned passage, a valve interposed between the inlet opening and the opening into the branched discharge passage, and means controlled by the pressure in the discharge passage and comprising the control device for opening the valve when the pressure in the discharge passage falls below a predetermined minimum.

2. A device for use in charging a container with a given pressure from a reservoir containing air at a higher pressure comprising in combination, a body member having a cylindrical opening extending therethrough and divided into an upper and a lower compartment by an imperforate transverse partition, a valve mechanism in the lower compartment, the body member having three passages for interconnecting the two compartments, one of the passages extending from a point near the lower end of the lower compartment to a point some distance above the bottom of the upper compartment, a complementary passage extending from a point similarly located in the upper compartment as that of the first passage, to a point near the top of the lower compartment, a branched discharge passage having one end in communication with the lower compartment at a point above the corresponding opening from the first passage and the other end in communication with the upper compartment near its bottom, a piston slidably mounted in the upper compartment and provided on its outer surface with a groove which forms an interconnecting passage between the corresponding ends of the first two passages, resilient means for urging the piston toward the bottom of the chamber, two perforated partitions located in the lower chamber, one of them being positioned above the opening into the first mentioned passage and below the opening into the branched passage, and the other partition being located above the opening into the branched discharge passage, a piston mounted for longitudinal movement in that part of the lower compartment above the upper partition, a spring pressed valve engaging the lower surface of the lower partition, means for unseating the valve when the piston in the upper end of the lower compartment moves downwardly, means for closing the opening in the upper partition when the valve in the lower partition is closed and means for providing for a slow leakage of air from the chamber between the top of the lower compartment and the piston located therein.

3. A tire inflating device comprising in combination a body member having two cylindrical openings extending thereinto, a piston slidable in one of the openings, means comprising a spring and an adjustable abutment for producing a force tending to move the piston to the bottom of the opening, the body member having two passages for connecting the openings, said passages terminating at spaced points in the opening containing the piston, the outer surface of the piston having a groove adapted to connect the passages when the piston is in its normal position, the body member being also provided with a passage that terminates at a point between the end of the piston and the bottom of the opening, the last named passage having a branch for making connection with a container to be inflated, a closure for the open end of the other opening, said closure being provided with an inlet opening, and valve mechanism controlled by the position of the piston for intermittently placing the branched passage in communication with the inlet opening, while the pressure in the container is below a minimum.

4. A device for use in inflating a container to a given pressure from a reservoir containing air at a higher pressure, comprising in combination, a body member having a cylindrical opening divided into upper and lower compartments by means of a central imperforate partition, a piston located in the upper compartment, resilient means for normally holding the piston in contact with the partition, the wall of the body member having two opposed openings at substantially the same distance from the partition, the piston having its outer surface provided with a groove positioned to connect the openings when it is in normal position, the lower compartment having an end closure provided with an inlet opening, a perforated partition located in the lower compartment, a spring pressed valve means for closing the perforation, one of the openings communicating with a passage terminating in the lower chamber between the end closure and the partition, a second perforated partition located inside of the first partition, the body member having a passage extending from the space between the two partitions in the lower compartment to the lower end of the upper compartment, the said passage having a branch for connection with the container, a piston located in the lower compartment between the bottom of the compartment and the inner partition, the body having a passage from the bottom of the second compartment to one of the openings in the wall of the upper compartment, there being a small passage for air from the bottom of the lower compartment to the outside of the body, and means comprising a pin for moving the spring pressed valve to an open position when the piston in the lower compartment is in its lowermost position, and valve means carried by the pin for closing the opening in the inner partition.

JOSEPH H. ALESSI.